June 4, 1957  A. DEUQUET  2,794,925
METHODS AND MEANS FOR EXECUTING STEREORADIOGRAMS
THROUGH A SELECTOR
Filed May 20, 1955  3 Sheets-Sheet 3

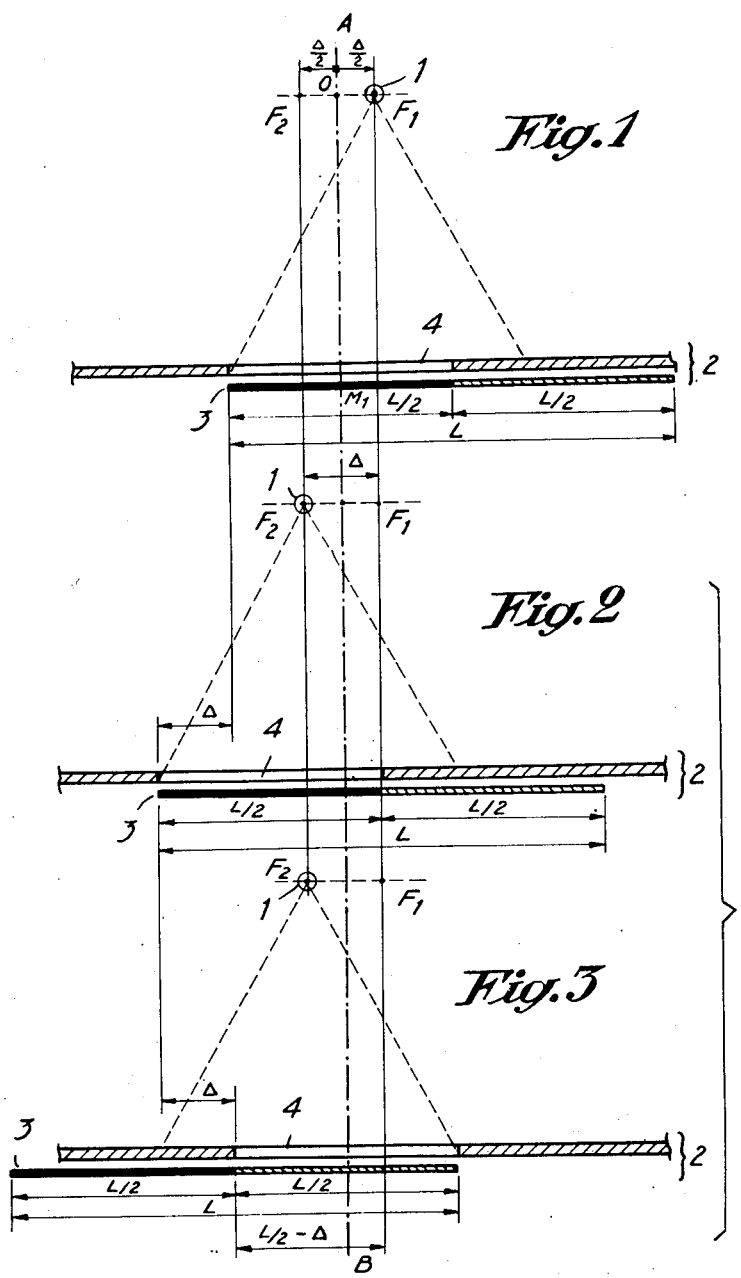

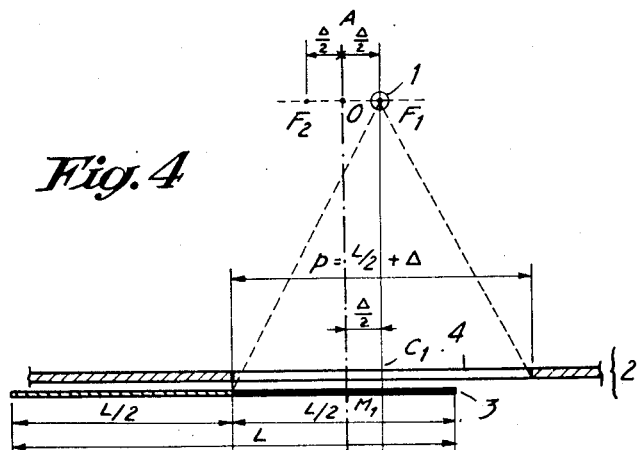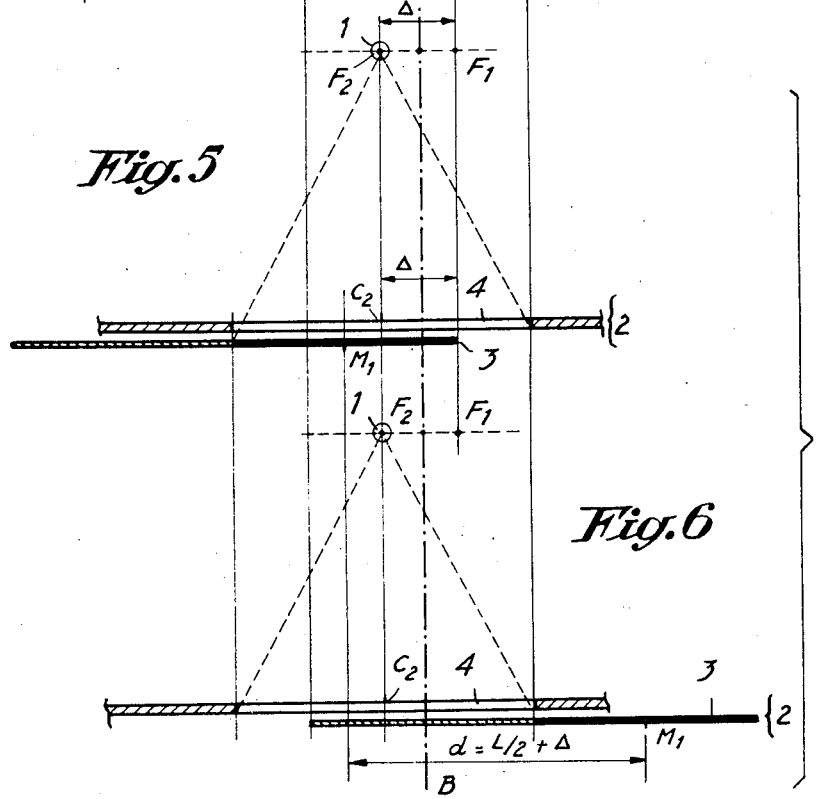

ARMAND DEUQUET, INVENTOR

PER Richards & Geier
ATTORNEYS

United States Patent Office 2,794,925
Patented June 4, 1957

---

2,794,925

METHODS AND MEANS FOR EXECUTING STEREORADIOGRAMS THROUGH A SELECTOR

Armand Deuquet, Chatelet, Belgium

Application May 20, 1955, Serial No. 510,006

Claims priority, application Belgium March 24, 1955

17 Claims. (Cl. 250—61)

It is a well known fact that when executing coupled stereoradiograms by means of conventional apparatuses, it is necessary after a first exposure to shift the X-ray tube by a basic distance Δ and then to bring the second film exactly into the position originally occupied by the first film. To this end, the operator resorts generally to a so-called Bucky table wherein the shifting of the tube and the replacement of the film-carrying cassette are performed by hand or else through so-called cassette changer wherein these operations are performed automatically.

The two associated films forming together the stereograms are constituted by independent films.

Whatever may be the means resorted to for the execution of such coupled stereoradiographic films, the interval between the two exposures is always equal to or higher than one second i. e. it is much too long in most cases.

My invention has for its object a method and means applicable to most radiological apparatuses now in use and it is also adapted to be incorporated into the design of novel apparatuses.

The method according to my invention allows executing automatically, through the selector, coupled stereoradiographic films within a fraction of a second. It is thus possible to execute inter alia stereoradiograms of the viscera.

The two associated elementary stereograms are in one i. e. they are executed on a common film.

At first sight, such a method for producing stereoradiographic pictures made through the selector is surprising since in practice, in all radiological apparatuses, the selector and the tube are rigidly secured to each other and cannot be subjected to any movement with reference to each other. The tube and the selector are thus shifted together while the cassette containing the film and also the lead masks may occupy different positions inside the selector.

In order to make the disclosure of my improved method easier, I will term axis of symmetry the axis perpendicular to the film area lying in register with the gate of the selector and passing through the center of said area and it should be remembered that the normal ray forms the axis of the cone of rays passing out of the tube.

This having been stated, the method according to my invention for executing coupled stereoradiographic pictures through the selector consists essentially in shifting the normal ray to a point at a distance $$\frac{\Delta}{2}$$

from the axis of symmetry, in taking the first elementary stereoradiogram on a first section of the film, in shifting the system including the tube and the selector through a distance Δ in a manner such that the tube is now located at a distance $$\frac{\Delta}{2}$$

from and on the other side of said axis of symmetry, in shifting the film and also, if required, the lead masks inside the selector so as to bring the second section of the film exactly into the location occupied by the first section with reference to the axis of symmetry for the taking of the first elementary stereoradiogram and in taking the second elementary stereoradiogram on said second section.

This method may be executed in various manners and the arrangements for said execution are particularly simple and may appear in various forms. The chief features of the method and means according to my invention will clearly appear from the following detailed description reference being made to the accompanying drawings wherein:

Figures 1, 2 and 3 illustrate diagrammatically the chief steps of a first embodiment of my method;

Figures 4, 5 and 6 illustrate diagrammatically the chief stages of a second embodiment of said method;

Figure 7:
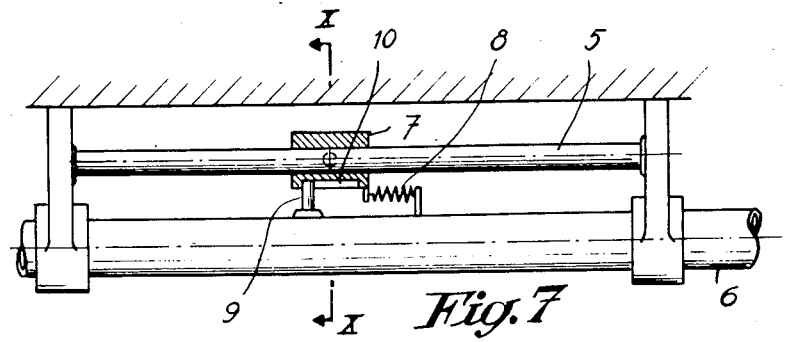
Figures 7, 8 and 9 are diagrammatic plan views of an auxiliary locking mechanism in three characteristic positions providing for the execution of last mentioned embodiment of the method as illustrated in Figures 4, 5 and 6.
Figure 8:
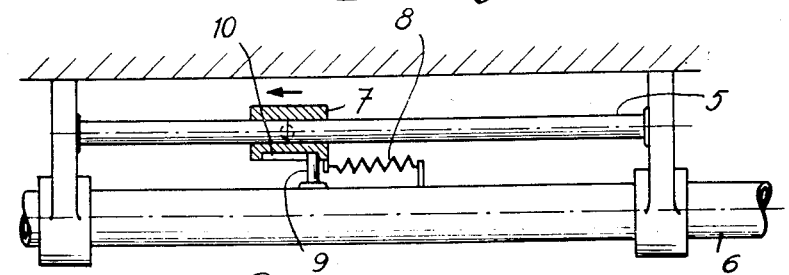

Referring to the diagram shown in Figures 1, 2 and 3, 1 designates the X-ray tube, 2 the selector and 3 the film adapted to serve for the execution of the two elementary stereoradiograms to be coupled.

As shown diagrammatically in Figure 1, the tube 1 is located in its starting position, F1, while one half of the length of the film 3 is brought into register with the gate 4 of the selector 2.

In this position, the tube 1 is located at a distance $$\frac{\Delta}{2}$$

from the axis of symmetry i. e. the axis AB passing through the center M1 of said half length of the film located in front of the gate 4. This provides for the execution of the first stereoradiogram. The system including the tube, the selector and the film, is now shifted longitudinally by a distance Δ in such a manner that the tube 1 is located at a distance $$\frac{\Delta}{2}$$

on the other side of said axis of symmetry AB assumed to be stationary. The tube 1 has thus entered the position corresponding to the execution of the second stereoradiogram of the couple.

It is now necessary to bring the second half of the film exactly into the location occupied by the first half at the moment of the execution of the first stereoradiogram so that consequently the centre of the second stereoradiogram coincides with said axis of symmetry.

It is possible to proceed in various manners, either according to the modus operandi illustrated in Figures 1, 2 and 3 or according to that illustrated in Figures 4, 5 and 6 if it is desired to limit the number of movements in which case the distances travelled over may be slightly greater.

In the case illustrated in Figures 1, 2 and 3, the film-containing cassette of the selector is located before operation in such a manner that the left hand section of the film is exposed for the first stereoradiogram. The latter being executed as described hereinabove and the system including the tube and the selector being then shifted by a distance Δ as described and as illustrated in Figure 2, it is sufficient when it is desired to bring the apparatus into its correct condition for the execution of the second stereoradiogram, to shift the shutter of the selector towards the right by a distance Δ while the film is shifted inside the selector towards the left by a distance $$\frac{L}{2}-\Delta$$

L being the total length of the film on which the two coupled stereoradiograms are to be executed.

It is thus apparent that, in order to bring the apparatus into the position for which the second elementary stereoradiogram of the couple is to be executed, it is necessary to perform three movements, namely, a movement towards the left by a distance Δ of the system including the tube and the selector, a second movement towards the right of the selector shutter by a same distance Δ and a third movement towards the left of the cassette carrying the film by a distance $$\frac{L}{2}-\Delta$$

It will be noted that the movements are of a comparatively small amplitude so that they may be executed at a high speed.

It is an easy matter to provide mechanisms executing such movements in an automatic sustantially simultaneous manner and consequently it is possible to execute without any difficulty the two elementary stereoradiograms of a couple within a fraction of a second.

If, for any technical reason, it is desired to reduce the number of movements, it is possible to operate as illustrated diagrammatically in Figures 4, 5 and 6. As a matter of fact, the first stage of the method up to the execution of the first stereoradiogram is similar to that disclosed for the first modus operandi except for the fact that the cassette is housed inside the selector in such a manner that the first stereoradiogram is executed on the right hand section of the film, i. e. the section on the side of the film which corresponds to the side of the axis of symmetry on which the tube 1 is located.

After execution of the first stereoradiogram, the system including the tube, the selector and the film is shifted towards the left by an amount such that the tube lies now at a distance $$\frac{\Delta}{2}$$

from the axis of symmetry AB but on the other side thereof, said axis of symmetry being as stated the axis perpendicular to the film passing through the centre M1 of the first stereoradiogram.

To bring this film into its second correct position inside the selector, it is then sufficient as illustrated in Figure 6 to bring the second half of the film exactly into the location occupied by the first half of the film during the execution of the first stereoradiogram, this being provided by a shifting of the film towards the right hand side through a distance equal to $$\frac{L}{2}+\Delta$$

It is thus possible to immediately execute the second stereoradiogram.

It should be noted that with such a modus operandi only two movements are required, to wit: one towards the left hand side by a distance Δ of the tube and selector system and the other towards the right hand side by a distance $$\frac{L}{2}+\Delta$$

of the film alone.

It should also be noted that the tube 1, and the selector 2 move exactly in unison with one another and are shifted simultaneously through a distance Δ. In spite of this complete synchronism between these two parts 1 and 2, it is possible to execute through the selector the two stereoradiograms of a couple with the same ease as through the conventional means, but at a speed which is considerably higher.

The method according to my invention is applicable to all types of selectors and to all sizes of cassettes.

As a matter of fact, the movements may be defined in a perfectly accurate manner as shown hereinafter by way of example. Δ is the basic distance between the stereoradiogram pictures, L the length of the cassette or of the film, d the amount of shifting of the cassette inside the selector, p the length of the opening in the lead shutters of the selector and consequently it is possible to easily reckon or define with reference to one another the following magnitudes:

(a) The bodily shifting Δ of the tube and selector,
(b) the position of the cassette with reference to the selector for the first exposure of the film,
(c) the shifting d of the cassette inside the selector between the two exposures,
(d) the length p of the opening in the lead shutter or mask carried by the selector and possibly its shifting.

It is sufficient to define before the reckoning a limit for certain magnitudes so that only one parameter is left which may be easily ascertained.

Thus, whatever modus operandi is adopted, it is possible to define first either the basic distance Δ or the length d of the shifting of the cassette inside the selector.

When defining Δ prior to operation, it is possible to resort to known standards. For instance, according to Wilsey, it is possible to obtain a maximum relief effect when the basic distance Δ is equal to one tenth of the distance separating the focus in the tube from the film. Said distance being on the average equal to 80 cm., it is possible to give the basic distance Δ a value of 8 cm., which allows an easy reckoning of the other data to be considered. As a matter of fact, and considering for instance the first modus operandi:

$$d=\frac{L}{2}-\Delta$$

$$p=\frac{L}{2}$$

assuming e. g. the basic distance has been ascertained previously and the size of the film has been selected in accordance with the requirements of the radiogram to be executed, it is an easy matter to define the opening of the gate in the shutter and the shifting of the film, taking into account the fact that, according to this modus operandi, the movement of the shutters of the selector is equal to the distance Δ considered as known.

In the second modus operandi:

$$d=\frac{L}{2}+\Delta$$

$$p=\frac{L}{2}+\Delta$$

It is apparent that d and p are equal and have values slightly higher than $$\frac{L}{2}$$

I may obtain thus easily all the numerical data required for the normal working of the method according to the invention, starting from a basic distance which is considered as favorable.

A further problem may consist in defining as a first step the distance d for the shifting of the cassette inside the selector. It is an easy matter to calculate therefrom Δ for a predetermined length of cassette. As a matter of fact, $$\Delta=d-\frac{L}{2}$$

in the second modus operandi and $$\Delta=\frac{L}{2}-d$$

in the first modus operandi.

For instance, when applying the method to an existing apparatus inside which the successive shiftings of the cassette are defined by stops, it is possible to start from the shifting allowed by said apparatus so as to deduce easily therefrom the basic distance Δ. If the shifting $d$ thus allowed has been defined as equal to 20 cm. while the length of the cassette is equal to 30 cm., the value of Δ is equal to $$d - \frac{L}{2} = 20 - \frac{30}{2} = 5 \text{ cm.}$$

As shown hereinabove, my improved method is extremely simple and may be applied in either case.

It should also be noted that an important condition underlying this method of producing a stereoradiogram through the selector resides in the proper centering of the part to be examined. As a matter of fact, for the first modus operandi, the framing is performed inside the opening of the gate which is equal to $$\frac{L}{2}$$

while the location of said opening should be calculated. On the contrary, according to the second modus operandi and with a view to saving time it is of interest not to center the above mentioned part when the tube is located in an intermediate position between F1 and F2. In fact, it is preferable to frame it directly inside the left hand side or right hand side of the beam of X-rays and more accurately within the part of the gate having for its length $$p = \frac{L}{2}$$

as if the selector had only an opening equal to $$\frac{L}{2}$$

As soon as the radioscopic framing has been obtained, the first exposure is made and, following this, the movable members are released so that they are automatically shifted into the correct position for the second exposure. Thus, the interval separating the two exposures may be reduced to a strict minimum, say a fraction of a second, said speed of execution being an essential condition for proper operation.

The relative movements of the movable members may be obtained through mechanisms of any type. However, the best results are obtained by means of apparatuses having the following features: a large power generator allowing for each negative of the coupled stereoradiogram an exposure ranging between one and five hundredths of a second, electromagnetic holding means providing for a separate stopping of the movements of the selector in the three directions of space so as to release consequently the transverse movement only after the taking of the first picture and lastly a selector which allows taking the two negatives in succession without it being necessary to return to radioscopic conditions.

Figure 9:
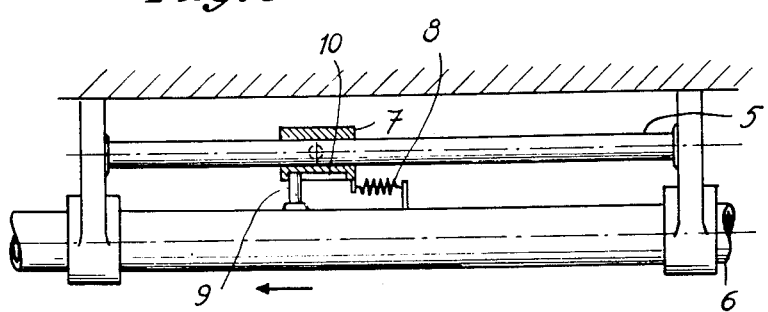
Figure 10:
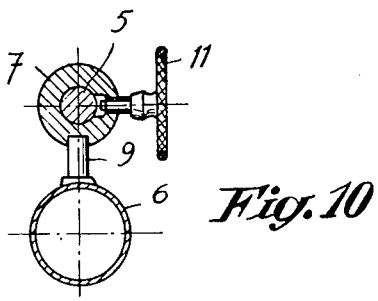
Figure 10 is a cross-section on a larger scale of the same mechanism through line X—X of Figure 7.

Apparatuses showing such features may, with the incorporation into them of the arrangement illustrated in Figures 7, 8, 9 and 10, produce stereoradiographic couples within a time which is clearly lower than one second. It is sufficient consequently to position behind the radiological table or the stationary support a rigid bar, for instance a metal tube 5 parallel with the movable tubular member 6 carrying the X-ray tube. The slider 7 is adapted to slide freely over said bar 5 and is urged back permanently by a return spring 8 secured on the other hand to the movable tubular member 6. A stud 9 rigid with the movable tubular member 6 engages through its free end a groove 10 inside the slider 7. Consequently, under the action of the spring 8, the slider 7 is permanently urged towards its right hand position as illustrated in Figure 7. After a radioscopic centering of the first negative and a locking in position of the selector, the slider 7 is brought into its second position illustrated in Figure 8 for which the stud 9 occupies the right hand position in the groove 10 of said slider; this being done, the slider is locked through the agency of the set-screw 11 (Figure 10). The first negative is then taken and immediately afterwards the selector is released so that the spring 8 may act and produce a predetermined lateral movement Δ which in the present case is equal to say 5 cm. after which the second negative is taken (Figure 9). The power and other data relating to the spring 8 should be suitably selected so as to provide a rapid and practically uniform return movement for the slider 7. For such conditions of operation, the spring will remain sufficiently stretched so as to define the location of the shifted plate without any vibration arising.

It should be noted that, in accordance with the second modus operandi and with a view to executing coupled stereoradiograms through the selector, it is necessary to shift towards the left or towards the right the plate carrying the X-ray tube for instance by 5 cm. and to shift towards the right for instance by 20 cm. the cassette carried by the selector. These two movements should be simultaneously executed at a high speed. For the first movement, it is sufficient to resort to an arrangement of the above mentioned type or obviously to any other arrangement adapted to produce an automatic shifting of the tube-carrier plate while limiting said movement to a predetermined value, say 5 cm.

As concerns the second movement, i. e. that of the cassette, it is necessary to fit to the lower end of its control handle a spring adapted to act immediately after the taking of the first picture so as to shift the handle and the cassette by the required distance towards the right hand side, for instance by 20 cm.

In most selectors, the control handle moves over a metal rod provided with stops. According to the amount of rotation executed by the metal rod, the operative stops are arranged differently so as to allow the execution of different types of negatives in succession. For a predetermined angular setting of said metal rod, the two stops should be provided at a distance of say 20 cm., for the successive taking of the two negatives of the couple. As soon as the first negative has been taken, suitable electric relays allow releasing electromagnetically controlled means holding the two springs in their stressed conditions. The shiftings of the plate and of the cassette are performed instantaneously and when the handle registers with the second stop, it operates an electric relay system releasing the high voltage adapted to produce the second negative.

As is apparent the two negatives of the coupled stereoradiograms may be taken automatically within a fraction of a second. Obviously, the modus operandi and the arrangement disclosed are applicable for all sizes of negatives since it is sufficient to provide for corresponding shiftings which may be easily reckoned.

What I claim is:

1. A method for executing the elementary stereoradiograms, forming a stereoradiographic couple, of a stationary part on two associated longitudinally aligned film sections through a gated selector, said method comprising the steps of exposing a first section through the gate in the selector, producing a beam of X-rays of which a ray perpendicular to the surface of the selector impinges on the film surface at a point at one half of a predetermined basic distance from an axis perpendicular to the centre of the first film section as then exposed, said X-ray beam forming the first stereoradiogram on said first film section, shifting the beam of X-rays in unison with the selector and the film sections, longitudinally of the film sections through a distance equal to the basic distance to make the said perpendicular ray lie on the other side of the location of said axis at a distance from the latter equal to one half the basic distance, shifting the film sections longitudinally inside the selector to bring the second film section into the exact location occupied by the first film section for the taking of the first stereoradiogram and executing the second stereoradiogram through action of the X-ray beam on the shifted second film section.

2. A method for executing the elementary stereoradiograms, forming a stereoradiographic couple, of a stationary part on two associated longitudinally aligned film sections through a gated selector and a lead-shutter carried by the latter and the opening defined by which registers with the gate in the selector, said method comprising the steps of exposing a first film section through the gate in the selector, producing a beam of X-rays of which a ray perpendicular to the surface of the selector impinges on the film surface at a point at one half of a predetermined basic distance from a stationary axis perpendicular to the selector gate, said X-ray beam forming the first stereoradiogram on said first film section, shifting the beam of X-rays in unison with the selector, lead shutter and film sections longitudinally of the film sections, through a distance equal to the basic distance to make the said perpendicular ray lie on the other side of the location of said axis at a distance from the latter equal to one half the basic distance, shifting the film sections longitudinally inside the selector to bring the second film section into the exact location occupied by the first film section for the taking of the first stereoradiogram and executing the second stereoradiogram through action of the X-ray beam on the shifted second film section.

3. A method for executing the elementary stereoradiograms, forming a stereoradiographic couple, of a stationary part on two associated longitudinally aligned film sections through a gated selector and a lead-shutter carried by the latter and the opening defined by which registers with the gate in the selector and has a length equal to that of the desired elementary stereoradiogram, said method comprising the steps of exposing a first film section through the gate in the selector, producing a beam of X-rays of which a ray perpendicular to the surface of the selector impinges on the film surface at a point at one half of a predetermined basic distance from a stationary axis perpendicular to the selector gate, said X-ray beam forming the first stereoradiogram on said first film section, shifting the beam of X-rays in unison with the selector, lead shutter and film sections longitudinally of the film sections, through a distance equal to the basic distance to make the said perpendicular ray lie on the other side of the location of said axis at a distance from the latter equal to one half the basic distance, shifting the selector and lead shutter in the direction opposed to the preceding shifting of the selector and lead shutter through a length equal to the said basic distance, shifting the film sections in the selector through a distance equal to the length of the desired stereoradiogram in a direction bringing the second section into register with the selector gate with an additional corrective shifting by the basic distance in a direction opposed to the first shifting and executing the second stereoradiogram through action of the X-ray beam on the second film section.

4. A method for executing the elementary stereoradiograms forming a stereoradiographic couple of a stationary part on two associated longitudinally aligned film sections through a gated selector, said method comprising the steps of bringing into register with the selector gate the film section on which the first stereoradiogram is to be obtained, the center of said section lying at half a predetermined basic distance from the centre of said gate and the other section lying in abutting relationship with the first section at the end thereof, producing an X-ray beam impinging on the first film section at a point located in register with the centre of the gate taking the first stereoradiogram through action of said X-ray beam on the first film section through the gate of the selector, shifting bodily the X-ray beam, the selector and the film in the direction leading from the tube to the centre of the first section through a distance equal to the predetermined basic distance and then shifting the film in a direction leading the second film section towards the centre of the gate by a distance equal to the length of the second film section adapted to carry the second stereoradiogram with a corrective shifting in a direction opposed to the first mentioned shifting movement by said basic distance and producing the second stereoradiogram through action of the X-ray beam on the second film section through the gate in the selector.

5. A method for executing stereoradiographic couples on a single film through successive exposures through a gated selector of the two individual stereoradiograms of each couple on the corresponding sections of the length of the film, said method comprising the steps of exposing the first section of the film to an X-ray beam to form a first individual stereoradiogram with the axis of symmetry perpendicular to said film section at its centre offset by one half predetermined basic distance with reference to the X-ray of the beam normal to the film surface, shifting the X-ray beam, selector and film bodily in a direction opposed to the direction of offset through a distance equal to said predetermined basic distance, shifting the film in the direction leading the second film section towards the centre of the gate by a length equal to one half the length of the film plus a further shifting by said predetermined distance in a direction opposed to the first shifting and forming the second individual stereoradiogram on the second half of the film.

6. A method for executing stereoradiographic couples on a single film through successive exposures through a gated selector of the two individual stereoradiograms of each couple on the corresponding sections of the length of the film, said method comprising the steps of introducing inside the selector a lead shutter the opening of which has a length equal to the desired length of an elementary stereoradiogram plus a predetermnied basic distance, exposing the first section of the film to an X-ray beam to form a first individual stereoradiogram with the axis of symmetry perpendicular to said film section at its centre offset by one half of said predetermined basic distance with reference to the X-ray of the beam normal to the film surface, shifting the X-ray beam, selector and film bodily in a direction opposed to the direction of offset through a distance equal to said predetermined basic distance, shifting the film in the direction leading the second film section towards the centre of the gate by a length equal to one half the length of the film plus a further shifting by said predetermined distance in a direction opposed to the first shifting and forming the second individual stereoradiogram on the second half of the film.

7. A method for executing stereoradiographic couples on a single film through successive exposures through a gated selector of the two individual stereoradiograms of each couple on the corresponding sections of the length of the film, said method comprising the steps of introducing inside the selector a lead shutter the opening of which has a length equal to the desired length of an elementary stereoradiogram plus a predetermined basic distance, exposing the first section of the film to an X-ray beam to form a first individual stereoradiogram with the axis of symmetry perpendicular to said film section at its centre offset by one half of said predetermined basic distance with reference to the X-ray of the beam normal to the film surface, shifting the X-ray beam, selector and film bodily in a direction opposed to the direction of offset through a distance equal to said predetermined basic distance, shifting the film in the direction leading the second film section towards the centre of the gate by a length equal to one half the length of the film plus a further shifting by said predetermined distance in a direction opposed to the first shifting and forming the second individual stereoradiogram on the second half of the film, the part to be examined being framed within a space registering with one end of the gate in the selector in the direction of the length of the selector during the formation of the first individual stereoradiogram and with the other end of said selector gate during the formation of the second individual stereoradiogram, the exposures being thus performed in sections of the selector gate the lengths of which are equal to that of the individual stereoradiograms.

8. A method for executing the elementary stereoradiograms, forming a stereoradiographic couple, of a stationary part on two associated longitudinally aligned film sections through a gated selector, said method comprising the steps of exposing a first film section through the gate in the selector, producing a beam of X-rays of which a ray perpendicular to the surface of the selector impinges on the film surface at a point at one half of a predetermined basic distance from an axis perpendicular to the centre of the first film section as then exposed, said X-ray beam forming the first stereoradiogram on said first film section, producing through a single operation a bodily shifting of the X-ray beam and selector in a given direction through the basic distance and simultaneously causing the film to be shifted inside the selector in a direction and to an extent such that the second section of the film enters exactly the location of the first section of the film during the execution of the first elementary stereoradiogram.

9. An apparatus for producing stereoradiograms on a film, comprising a longitudinally movable table, an X-ray tube rigidly carried by said table, a selector and a film cassette shiftably carried by said table to move longitudinally thereof, a stationary guide with reference to which said table is shiftably mounted, the selector carried by said table having a gate through which the X-rays from the tube are adapted to impinge on the film carried by the cassette, a slider rigid with the guide and provided with a longitudinal groove the length of which is equal to a basic distance, a stud rigid with the table and slidingly engaging said groove on the slider, a return spring urging said stud into engagement with one end of the groove and means for holding said stud fast in its other extreme position engaging the other end of the groove.

10. An apparatus for producing stereoradiograms on a film, comprising a longitudinally movable table, an X-ray tube rigidly carried by said table, a selector and a film cassette shiftably carried by said table to move longitudinally thereof, a stationary guide with reference to which said table is shiftably mounted, the selector carried by said table having a gate through which the X-rays from the tube are adapted to impinge on the film carried by the cassette, a slider rigid with the guide and provided with a longitudinal groove the length of which is equal to a basic distance, a stud rigid with the table and slidingly engaging said groove on the slider, a return spring urging said stud into engagement with one end of the groove, means for holding said stud fast in its other extreme position engaging the other end of the groove, a handle controlling the movement of the film cassette, a spring engaging said handle and adapted to shift the film cassette and the handle towards one side of the table.

11. An apparatus for producing stereoradiograms on a film, comprising a longitudinally movable table, an X-ray tube rigidly carried by said table, a selector and a film cassette shiftably carried by said table to move longitudinally thereof, a stationary guide with reference to which said table is shiftably mounted, the selector carried by said table having a gate the length of which is equal to the length of an elementary stereoradiogram plus a basic distance and through which the X-rays from the tube are adapted to impinge on the film carried by the cassette, a slider rigid with the guide and having formed therein a longitudinal groove the length of which is equal to said basic distance, a stud rigid with the table and slidingly engaging said groove on the slider, a return spring urging said stud into engagement with one end of the groove, means for holding said stud fast in its other extreme position engaging the other end of the groove, a handle controlling the movement of the film cassette, and a spring engaging said handle and adapted to shift the film cassette and the handle towards one side of the table.

12. An apparatus for producing stereoradiograms on a film, comprising a longitudinally movable table, an X-ray tube rigidly carried by said table, a selector and a film cassette shiftably carried by said table to move longitudinally thereof, a stationary guide with reference to which said table is shiftably mounted, the selector carried by said table having a gate the length of which is equal to the length of an elementary stereoradiogram plus a basic distance and through which the X-rays from the tube are adapted to impinge on the film carried by the cassette, a slider rigid with the guide and having formed therein a longitudinal groove the length of which is equal to said basic distance, a stud rigid with the table and slidingly engaging said groove on the slider, a return spring urging said stud into engagement with one end of the groove, means for holding said stud fast in its other extreme position engaging the other end of the groove, a handle controlling the movement of the film cassette, a spring engaging said handle and adapted to shift the film cassette and the handle towards one side of the table, electromagnetic means normally urging the two springs into their tensioned operative condition, electric relays adapted to release said electromagnetic means and thereby release the springs and stops spaced by a distance equal to the basic distance referred to and adapted to cooperate with the cassette to define the two positions of the latter corresponding to the exposure of the two film sections.

13. An apparatus for producing stereoradiograms on a film comprising a longitudinally movable table, an X-ray tube rigidly carried by said table, a selector and a film cassette shiftably carried by said table to move longitudinally thereof, a stationary guide with reference to which said table is shiftably mounted, the selector carried by said table having a gate the length of which is equal to the length of an elementary stereoradiogram plus a basic distance and through which the X-rays from the tube are adapted to impinge on the film carried by the table, a slider rigid with the guide and having formed therein a longitudinal groove the length of which is equal to said basic distance, a stud rigid with the table and slidingly engaging said groove on the slider, a return spring urging said stud into engagement with one end of the groove, means for holding said stud fast in its other extreme position engaging the other end of the groove, a handle controlling the movement of the film cassette, a spring engaging said handle and adapted to shift the film cassette and the handle towards one side of the table, electromagnetic means normally urging the two springs into their tensioned operative condition, electric relays adapted to release said electromagnetic means and thereby release the springs, stops spaced by a distance equal to the basic distance referred to and adapted to cooperate with the cassette to define the two positions of the latter corresponding to the exposure of the two film sections, a relay registering with the location of the second stop and adapted to be controlled by the impact of the control handle on the latter and means whereby said relay controls the energization of the X-ray tube for the execution of the second elementary stereoradiogram.

14. In a stereoradiographic camera, the combination of a stationary support, an X-ray tube, a selector and a film cassette adapted to be longitudinally shifted with reference to each other and to the support and means adapted to produce upon actuation first a bodily shifting of the tube and of the selector through a basic distance and then a shifting of the film with reference to the selector by a length equal to the length of the section of the film to be impressed at each exposure with the algebraic addition to said length of the first mentioned basic distance with a sign depending on the relative position of the film sections carried in longitudinal abutting positions by the cassette.

15. In a stereoradiographic camera, the combination of an X-ray tube, a selector having a gate the opening in which has a length equal to that of the elementary stereoradiogram to be obtained plus a basic distance, a common support with reference to which the tube and selector are adapted to be shifted bodily, a film cassette carried by the selector and adapted to be shifted with reference to the gate in the latter and to carry a film on two longitudinally adjacent sections of which the elementary stereoradiograms are to be formed, the length of each section being equal to that of the desired elementary stereoradiogram to allow exposure of each section through one end and the central portion of the gate, leaving the other end of said gate unused through a length equal to the basic distance above referred to and means adapted to produce upon actuation first a bodily shifting of the tube and of the selector through a basic distance and then a shifting of the film with reference to the selector by a length equal to the length of the section of the film to be impressed at each exposure with the algebraic addition to said length of the first mentioned basic distance with a sign depending on the relative position of the film sections carried in longitudinal abutting positions by the cassette.

16. An arrangement for producing stereoradiograms on a film comprising a longitudinally movable table, an X-ray tube rigidly carried by said table, a selector and a film cassette shiftably carried by said table to move longitudinally thereof, a stationary guide with reference to which said table is shiftably mounted, the selector carried by said table having a gate the length of which is equal to the length of an elementary stereoradiogram plus a basic distance and through which the X-rays from the tube are adapted to impinge on the film carried by the cassette, a slider rigid with the guide and having formed therein a longitudinal groove the length of which is equal to said basic distance, a stud rigid with the table and slidingly engaging said groove on the slider, a return spring urging said stud into engagement with one end of the groove, means for holding said stud fast in its other extreme position engaging the other end of the groove, a handle controlling the movement of the film cassette, a spring engaging said handle and adapted to shift the film cassette and the handle towards one side of the table, electromagnetic means normally urging the two springs into their tensioned operative condition, electric relays adapted to release said electromagnetic means and thereby release the springs, stops spaced by a distance equal to the basic distance referred to and adapted to cooperate with the cassette to define the two positions of the latter corresponding to the exposure of the two film sections and means controlled by the inpact of the casette against one of said stops and adapted to speedily urge the film after the exposure of the first film section into its correct position for the exposure of the second section and for simultaneously energizing the X-ray tube.

17. In a stereoradiographic camera, the combination of a stationary support, an X-ray tube, a gated selector and a film cassette adapted to be longitudinally shifted with reference to each other and to the support and means adapted to produce upon actuation first a bodily shifting of the tube and of the selector through a basic distance and then a shifting of the film with reference to the selector by a length equal to the length of the section of the film to be impressed at each exposure with the alebraic addition to said length of the first mentioned basic distance with a sign depending on the relative position of the film sections to urge the second section of the film into the exact location occupied by the first section of the film with reference to an axis perpendicular to the selector gate at the center of the latter.

References Cited in the file of this patent
UNITED STATES PATENTS

| | | |
|---|---|---|
| 2,167,114 | Kieffer | July 25, 1939 |
| 2,511,097 | Bonnet | June 13, 1950 |
| 2,558,539 | Chausse | June 26, 1951 |